(12) United States Patent
Perinet et al.

(10) Patent No.: US 12,453,980 B2
(45) Date of Patent: Oct. 28, 2025

(54) ROTARY COATING PRODUCT SPRAYER AND METHOD FOR CONTROLLING A SURFACE TEMPERATURE OF SUCH A SPRAYER

(71) Applicant: Exel Industries, Epernay (FR)

(72) Inventors: Sylvain Perinet, Paris (FR); Denis Vanzetto, Paris (FR)

(73) Assignee: EXEL INDUSTRIES, Epernay (FR)

( * ) Notice: Subject to any disclaimer, the term of this patent is extended or adjusted under 35 U.S.C. 154(b) by 612 days.

(21) Appl. No.: 17/835,992

(22) Filed: Jun. 9, 2022

(65) Prior Publication Data
US 2022/0395847 A1 Dec. 15, 2022

(30) Foreign Application Priority Data
Jun. 15, 2021 (FR) ..................... 21 06308

(51) Int. Cl.
*B05B 3/10* (2006.01)
(52) U.S. Cl.
CPC ............ *B05B 3/105* (2013.01); *B05B 3/1007* (2013.01)
(58) Field of Classification Search
USPC ........ 118/321, 323, 666, 667, 712; 239/223, 239/224; 427/421.1
See application file for complete search history.

(56) References Cited

U.S. PATENT DOCUMENTS

| | | | |
|---|---|---|---|
| 2004/0081769 A1 | 4/2004 | Krumma et al. | |
| 2009/0020635 A1 | 1/2009 | Yasuda | |
| 2010/0206962 A1* | 8/2010 | Nolte | B05B 3/001 239/223 |
| 2013/0017068 A1 | 1/2013 | Baumann et al. | |
| 2015/0217306 A1* | 8/2015 | Matsumoto | B05B 3/1092 118/323 |
| 2018/0345304 A1 | 12/2018 | Kobayashi et al. | |

FOREIGN PATENT DOCUMENTS

| | | | | |
|---|---|---|---|---|
| EP | 2 808 089 A1 | 12/2014 | | |
| FR | 2 860 996 A1 | 4/2005 | | |
| FR | 2 906 162 A1 | 3/2008 | | |
| FR | 3103718 A1 * | 6/2021 | ............ | B05B 12/18 |
| JP | 108 108104 A | 4/1996 | | |
| JP | H08 108104 A | 4/1996 | | |
| JP | H09 285742 A | 11/1997 | | |
| JP | 2005034703 A * | 2/2005 | | |

(Continued)

OTHER PUBLICATIONS

English Translation FR3103718 (Year: 2021).*

(Continued)

*Primary Examiner* — Yewebdar T Tadesse
(74) *Attorney, Agent, or Firm* — Soquel Group LLC

(57) ABSTRACT

A rotary coating sprayer including a spray bowl rotating about an axis of rotation and an air turbine for driving the bowl. The turbine includes a rotor and a body forming a support for the rotor and defining at least one air feedline for a rotation chamber wherein the rotor blades are arranged. The feedline includes an intermediate chamber defined, radially to the rotation axis, between the body and a ring mounted around the body. In this way, lowering of temperature of an element of the sprayer housing due to flow of exhaust air from the turbine, is limited.

15 Claims, 7 Drawing Sheets

(56) References Cited

FOREIGN PATENT DOCUMENTS

Figure 1:
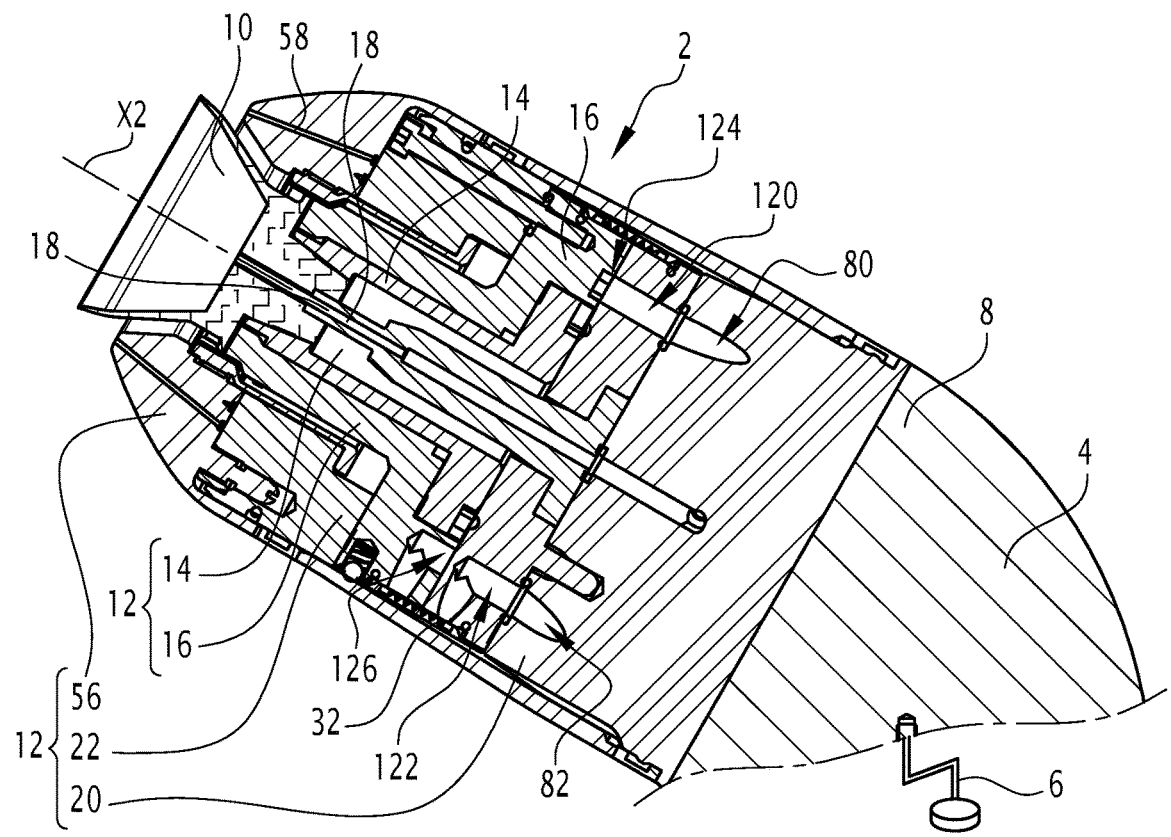

| | | | | |
|---|---|---|---|---|
| JP | 4927738 | B2 | 2/2012 | |
| JP | 6654003 | B2 * | 2/2020 | ........... B05B 5/0415 |
| WO | 2017141964 | A | 8/2017 | |
| WO | WO-2018043071 | A1 * | 3/2018 | ............... B05B 1/02 |

OTHER PUBLICATIONS

English Translation JP-2005034703-A (Year: 2005).*
English Translation JP-6654003-B2 (Year: 2005).*
English Translation WO-2018043071-A1 (Year: 2018).*
French Patent Application No. 21-06308, INPI Rapport de Recherche Préliminaire, Feb. 23, 2022, 3 pages.

* cited by examiner

ROTARY COATING PRODUCT SPRAYER AND METHOD FOR CONTROLLING A SURFACE TEMPERATURE OF SUCH A SPRAYER

CROSS-REFERENCE TO RELATED APPLICATION

This application claims priority of French Patent Application No. 21 06308, filed on Jun. 15, 2021.

FIELD OF THE INVENTION

The present invention relates to a rotary coating product sprayer intended in particular to be used for applying a coating product to a surface to be coated. The invention also relates to a method for controlling a surface temperature of such a sprayer.

BACKGROUND OF THE INVENTION

A rotary sprayer is used, e.g., to apply a paint or varnish type coating onto a motor vehicle body, onto a motor vehicle component or onto a household appliance housing.

Such a sprayer includes a bowl driven in rotation about an axis of rotation by a turbine, which can be an air turbine, i.e., a turbine which includes a rotor whose rotation results from the flow of an air stream which impacts on the blades rigidly connected to the rotor.

This type of sprayer gives overall satisfaction. However, a problem arises because of the expansion of the drive air which must be brought to the vicinity of the blades with a relatively high pressure on the order of 6 bar, and which is at a pressure close to the atmospheric pressure at the turbine outlet. This expansion of the drive air, which becomes the exhaust air after impacting the rotor blades, has the effect of cooling the rotor significantly, with a temperature amplitude on the order of 20°.

Thus, considering that the air enters the turbine at a temperature of 20 to 25 degrees Celsius (° C.), and with a relative humidity between 55% and 65%, the temperature of the exhaust air leaving the turbine may be lower than the dew point, which is between 10 and 18° C., which has the effect of condensing the moisture in the air to the point where water droplets can accumulate on the outside of the sprayer, even if the turbine body is covered with a cover. These water droplets are likely to fall off the sprayer during spraying and may fall by gravity, or be carried by airflow, onto the surface being coated. This would create a defect in the applied coating.

In practice, this is not acceptable and it is known to attempt to regulate the drive air flow of an air turbine to limit the risk of water condensation due to the exhaust air temperature.

EP-A-2 808 089, e.g., describes how to direct a portion of the feed air from an air bearing into a volume where a pressure drop could occur. The effect of this approach is to increase the overall air consumption of the sprayer, which requires additional resources to produce pressurized air and increases the cost of operating a coating facility equipped with such a sprayer.

It is also known how to insert an electric air heater into an air feed line of a sprayer to bring the drive air to a temperature on the order of 40° C., so that the exhaust air is not likely to reach a temperature at the turbine outlet that could induce the condensation of the moisture present in the air. This approach is particularly energy consuming and requires acquisition of expensive additional equipment.

SUMMARY OF THE DESCRIPTION

The invention aims at solving these problems by proposing a new rotary coating product sprayer with which the risk of water condensation on the surface of the sprayer is largely reduced, or even completely eliminated, without substantially reducing the energy performance of the sprayer.

To this end, the invention relates to a rotary coating product sprayer comprising a spray bowl rotating about an axis of rotation and an air turbine for driving the bowl in rotation about the axis, the turbine including a rotor and a body forming a support for the rotor and defining at least one air feedline for feeding air to a rotation chamber wherein rotor blades are arranged. According to the invention, the feedline for feeding air to the rotation chamber includes an intermediate chamber which defined, radially to the rotation axis, between the turbine body and a ring mounted around this body.

With the invention, the intermediate chamber of the feedline, which is defined between the body and the ring mounted around the body, forms a relatively warm air circulation zone in the outermost part of the body, which avoids a marked lowering of the temperature of the periphery of the body in the zone. This has the effect of limiting the risk of condensation in the area of the sprayer. The air flowing through the intermediate chamber can then be used to drive the rotor in rotation, or even to power a component other than the turbine. By another component of the turbine, it is to be understood, a member for shaping the conical flow of paint, also called "air skirt", or a sound sensor configured to measure the rotation speed of the rotor. The use of a turbine element feed airflow reduces the energy consumption of the device compared to a solution using an airflow dedicated only to limit cooling, or a device for heating the incoming flow.

Since the rotating chamber is fed through the line that includes the intermediate chamber, air flowing through the intermediate chamber does not have to be fed to the sprayer in addition to the air used for normal sprayer operation. In addition, as the turbine accelerates, the exhaust air cools, but as the feed air flow rate increases, so does the thermal effect of the air flowing through the intermediate chamber. In other words, the cooling of the turbine exhaust air and the compensation of the cooling obtained by the ring mounted around the sprayer body evolve in the same way depending on the turbine speed. Moreover, since the turbine feed air is the most powerful flow and has the highest flow rate among the different flows feeding a functional component of the sprayer, a higher heating performance is obtained because a larger quantity of air is exposed to the heat transfer effect between the outside of the sprayer r and the air of the intermediate chamber via the ring. In addition, since the head losses are related to the pressure and to the flow rate of the feed air, the energy consumption due to the head losses is a function of the energy required for rotating the sprayer bowl.

According to advantageous yet non-mandatory aspects of the invention, such a sprayer may incorporate one or a plurality of the following features taken in any technically admissible combination:

The feedline includes at least one branch that extends parallel to the axis of rotation and an elbow that connects the branch with the intermediate chamber, radially to the axis of rotation.

The feedline includes a spiral portion perpendicular to the axis of rotation, which opens into the rotation chamber, and an elbow which connects the intermediate chamber with the spiral portion.

The sprayer is equipped with a component which defines channels for the airflow shaping a cloud of droplets which leaves the edge of the spray bowl, while the feedline that includes the intermediate chamber feeds the channels with skirt air.

The sprayer is equipped with at least one cavity, rigidly connected to the rotor, and with a microphone for measuring the noise of an air flow coming from the cavity so as to determine the speed of rotation of the spray bowl, while the feedline that includes the intermediate chamber feeds the microphone with air through the cavity.

The body includes a tubular portion which defines a housing which receives the rotor and a base which closes the housing opposite the bowl, while the ring is mounted around both the tubular part and the base.

The ring is provided, on the inner radial surface thereof, with at least one pattern in relief, in particular ribs or a thread, configured to enhance heat exchange between, on the one hand, the air circulating in the intermediate chamber and, on the other hand, the ring.

The ring is made of metal.

The sprayer includes a sub-assembly for balancing the electrical potential between the ring and the body, wherein the sub-assembly is provided more particularly in the form of an elastically deformable electrically conducting member resting, either directly or via an attached electrically conducting element, against the ring and against the body.

The ring is immobilized around the body by wedging.

At least one seal, preferentially two seals, is or are placed in between the body and the ring and contributes or contribute to wedge the ring around the body.

The intermediate chamber is formed around a portion of the body wherein a turbine exhaust manifold is formed.

The sprayer is equipped with a temperature sensor for determining the temperature of the air in the intermediate chamber, the temperature of the ring or the temperature of a sprayer cover.

According to another aspect, the invention relates to a method for controlling the surface temperature of a rotary coating product sprayer including a spray bowl rotating about an axis of rotation and an air turbine for driving the bowl in rotation about the axis of rotation, wherein the turbine includes a rotor and a body forming a support for the rotor, the method includng feeding air to a rotation chamber inside which rotor blades are arranged. According to the invention, the feeding includes a diverting a flow of driving air for the rotor towards a peripheral area of the body in order to limit a lowering of the temperature of a covering element of the sprayer.

Advantageously, a control unit of the sprayer is configured for adjusting the operating parameters of the sprayer, or of the booth inside which the sprayer is installed, depending on the output signal of the temperature sensor.

BRIEF DESCRIPTION OF THE DRAWINGS

The invention will be better understood and other advantages thereof will become clearer in the light of the following description of an embodiment of a sprayer in accordance with the principle thereof and of a method for controlling the surface temperature thereof, given by way of example only and in reference to the attached drawings wherein:

FIG. 1 is an axial section of a rotary sprayer in accordance with the invention, mounted on the wrist of a manipulator robot;

FIG. 2 is an axial section of a turbine belonging to the sprayer shown in FIG. 1;

FIG. 3 is a larger scale view of detail III in FIG. 2;

FIG. 4 is an axial section of the turbine of FIGS. 2 and 3 taken in a plane offset about an axis of rotation, with respect to the plane in FIGS. 2 and 3;

FIG. 5 is an exploded perspective view of the turbine of FIGS. 2 to 4;

FIG. 6 is a perspective view of the turbine of FIGS. 2-5, according to arrow VI in FIG. 2, wherein a base is omitted for the clarity of the drawing; and FIG. 7 is a perspective section of the turbine of FIGS. 2-6, wherein the base is shown separately from the rest of the turbine and viewed under a different angle.

DETAILED DESCRIPTION

The electrostatic sprayer 2 shown in FIG. 1 is mounted on the wrist 4 of a multi-axis robot 6 which is shown very schematically. Wrist 4 defines an interface zone 8 through which run unshown feed lines of sprayer 2 for fluids, including turbine drive air, skirt air and liquid coating material, as well as power cables for high-voltage parts.

Sprayer 2 includes a bowl 10 designed to be rotated about an axis of rotation X2 defined by a body 2A of sprayer 2. Bowl 10 is rotated about axis X2 by an air turbine 12 which includes a rotor 14 which is rotatable about axis X2 and to which bowl 10 is rigidly attached, and a body 16 which forms a support for rotor 14.

Body 2A includes a main part 20 into which turbine 12 is inserted and which rests against interface zone 8 and an auxiliary body 22.

Turbine 12, which is one of the components of sprayer 2, is shown alone in FIG. 2 and the following figures.

Rotor 14 and body 16 are hollow and together define a volume V18 which forms a housing for receiving a coating product injector 18 for bringing, as close as possible to bowl 10, a flow of liquid coating product to be sprayed using bowl 10.

Here, advantageously, the injector is aligned with axis X2.

Rotor 14 is equipped with blades 142 which are formed on an annular and axial surface 143 of a ring 144 mounted around a hub 146. The number, distribution and geometry of blades 142 depends on the design choice of rotor 14, and on the intended rotational speed of bowl 10.

Alternatively, other structures are possible for rotor 14. For example, parts 144 and 146 may be one-piece, or the blades may be formed on a peripheral surface of rotor 14.

Body 16 includes a tubular portion 162 and a base 164, centered on longitudinal axis X162 and X164, respectively. In the assembled configuration of body 16, axes X162 and X164 are coincident and define a central axis X16 of body 16. In the assembled configuration of sprayer 2, axes X2 and X16 are coincident.

Tubular portion 162 defines a volume V16 for receiving rotor 14, which is introduced into this receiving volume from below, as shown in FIGS. 2 and 4, while base 164 closes this volume downward in these figures. Volume V16 is centered on axis X16.

Two air bearings which are not shown are formed on either side of ring 144, along axis X2 respectively. The bearings allow rotor 14 to be positioned relative to body 16, within volume V16 and along axis X2, when same are supplied with air. The air bearings allow non-contact rotation of rotor 14 in body 16. The air bearings participate in centering rotor 14 along axis X2, and may be referred to as axial air bearings.

On the other hand, a radial air bearing is formed around rotor 14 within volume V16 and within tubular portion 162. The radial air bearing allows rotor 14 to be centered about axis X16, inside housing 16.

In an embodiment, the bearings of turbine 12 may be roller bearings.

In the assembled configuration of the turbine shown in FIGS. 1-4 and 6, blades 142 are arranged in a rotation chamber 26 formed between portions 162 and 164 of body 16, in a portion left free by rotor 14.

Base 164 is secured to tubular portion 162 by means of a plurality of screws 167 that cross through base 164 from side to side, parallel to axis X164, and are received in corresponding internal threads of tubular portion 162.

Screws 28 cross through bores 282 and 284 provided through tubular portion 162 and through base 164, respectively, and secure turbine 12 against main portion 20.

Tubular portion 162 has a stepped external shape. Specifically, portion 162 has a circular cross-section about axis X162 and includes a front portion 162A, which is arranged on the side of bowl 10 when the same is in place; i.e., towards the front of the sprayer, and which has a first outer diameter D162A. Portion 162 also includes a rear portion 162B opposite bowl 10 when same is mounted; i.e., arranged toward the rear of the sprayer, and which has a second outer diameter D162B that is strictly greater than first diameter D162A. Base 164 also has a circular cross-section about axis X164 and has an outer diameter D164 identical to diameter D162B. Thus, portions 162B and 164 constitute the portion of body 16 with the largest diameter.

Alternatively, portions 162 and/or 164 do not have circular external cross sections. In this case, the tubular portion is stepped in the sense that the largest external dimension of front portion 162A, transverse to axis X162, is strictly smaller than the largest external dimension of rear portion 162A, transverse to axis X162. Portions 162B and 164 also constitute the portion of the body with the largest dimension transverse to axis X16.

Front portion 162A is surrounded by auxiliary body 22 which supports adjacent components and wherein unshown flow lines are formed, auxiliary body 22 is sometimes referred to as an "inner skirt". Same is made of a thermally insulating material, such as a plastic material, so that same isolates front portion 162A from a cover 90 which covers turbine body 16 and auxiliary body 22.

Keying pins 30 allow turbine 12 to be oriented about axis X2 with respect to main portion 20 on the rear, and with respect to inner skirt 22 on the front.

Rotation chamber 26 is supplied with air for rotating rotor 14 in through ducts 120 and 122, wherein the ducts are supplied with air through ducts 80 and 82 formed in main portion 20.

Duct 120 is straight, and, in the example, parallel to axis X16 and connected directly to a groove 124 in a spiral portion centered on axis X16. Duct 120 is formed in base 164, while groove 124 is formed in tubular portion 162. The flow of the drive air through body 16 along this first path is represented by the arrows E1 in FIGS. 2 and 6.

Duct 122 is connected to a second groove 126, also in a spiral portion centered on axis X16, which opens into chamber 26 and is formed in tubular portion 162.

Here, grooves 124 and 126 are formed in portion 162 symmetrically about axis X162.

In practice, in this example, grooves 124 and 126 are formed in a face of portion 162B facing base 164 and extending perpendicularly to axes X162 and X16, hence to axis X2 in the mounted configuration of sprayer 2.

Duct 122 is straight, and in the example, parallel to axis X2, and connected to an elbow 128 which opens onto peripheral surface S164 of base 164, facing a ring 32 which surrounds both portions 162B and 164 of body 16.

On the other hand, an elbow 130 is provided in annular portion S162 and opens onto outer peripheral surface S162 of portion 162B.

Surfaces S162 and S164 are flush and have the same diameter, either D162B or D164, which corresponds to the fact that ring 32 has the same diameter along length L32 thereof parallel to axis X2.

If, in an embodiment, diameters D162B and D164 are different, ring 32 may be stepped.

Opposite to the opening thereof onto surface S162, elbow 130 is linked to spiral groove 126.

Figure 2:
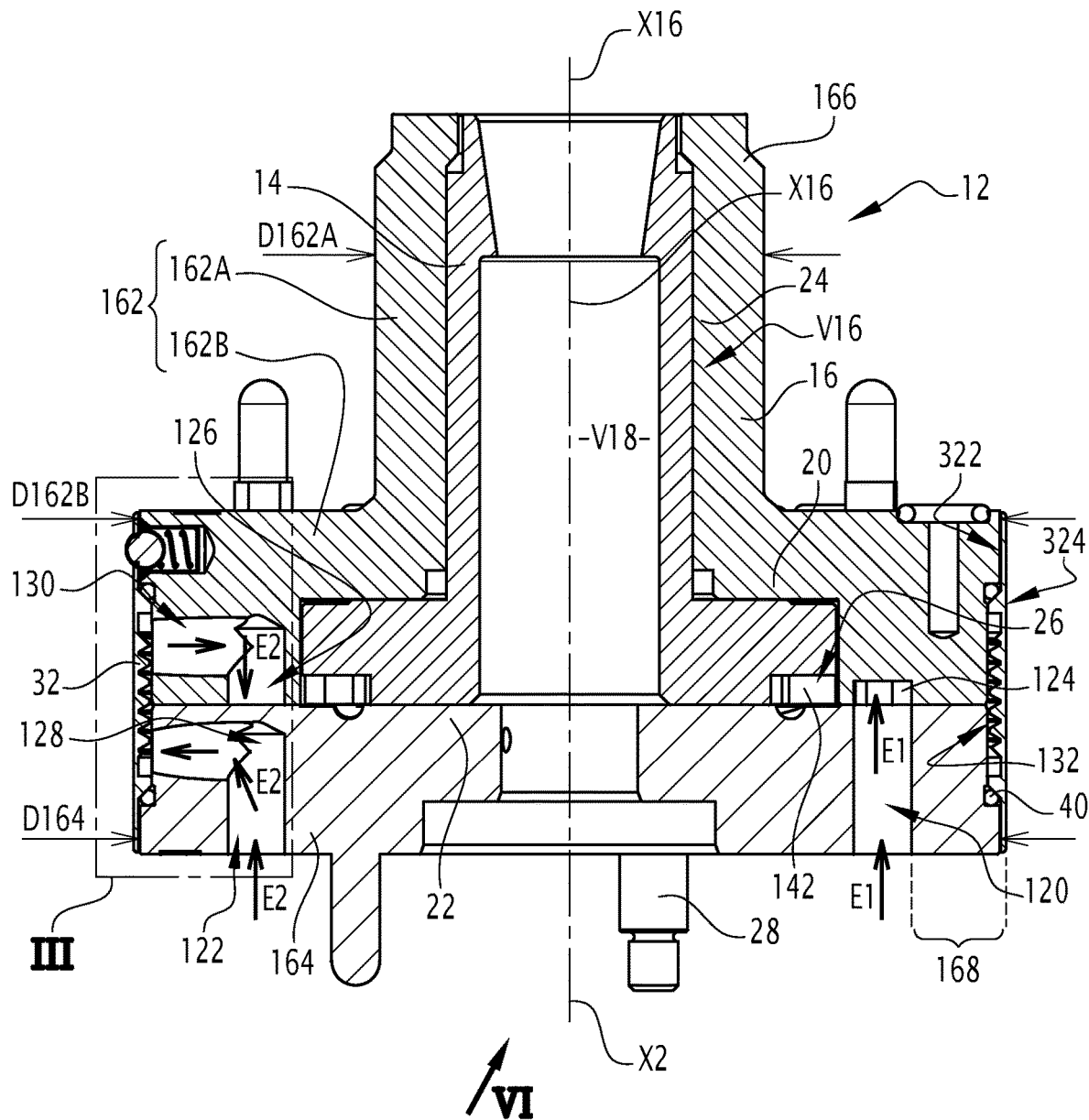
Figure 3:
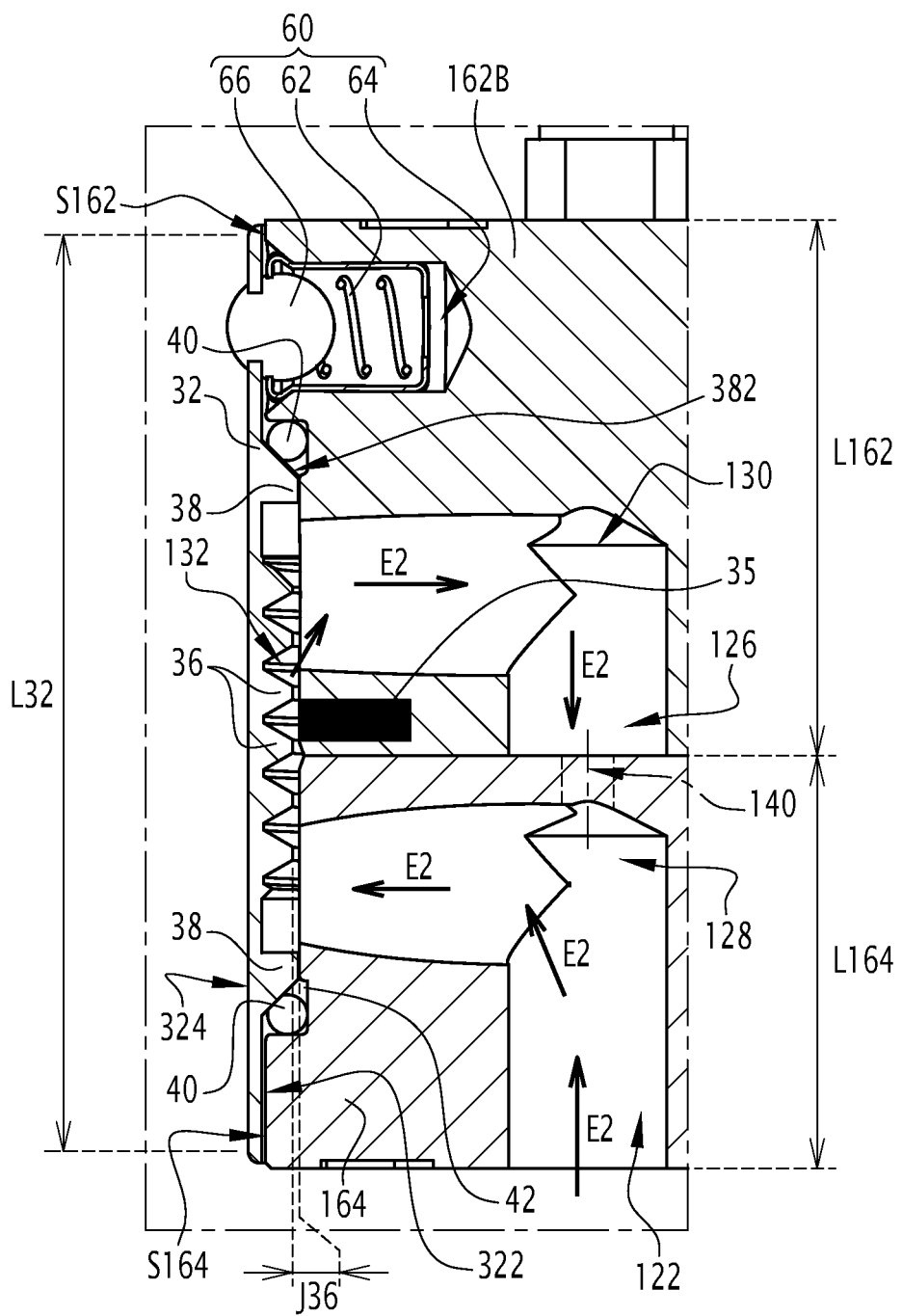
Figure 6:
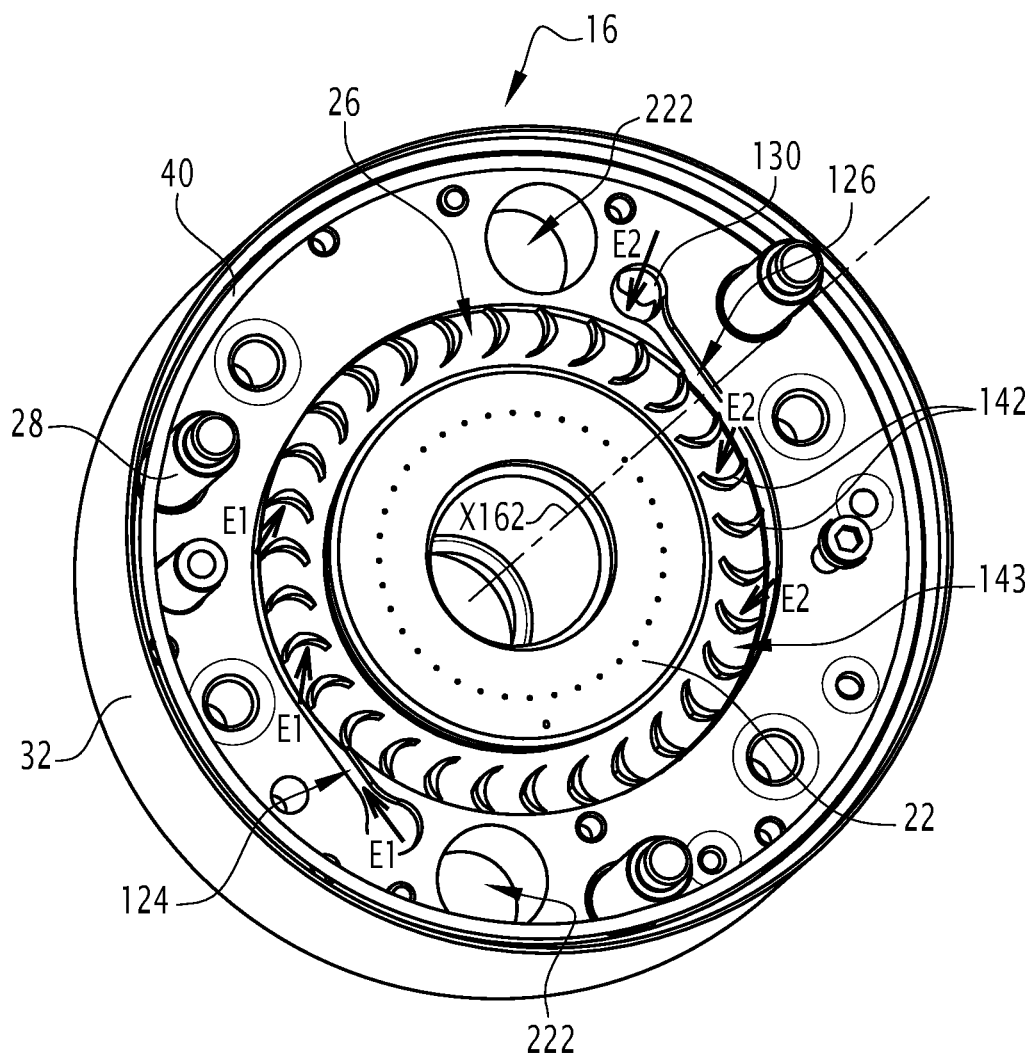

Along a direction radial to axis X2, between surfaces S162 and S164, on the one hand, and an inner radial surface 322 of ring 32, an annular chamber 132 is formed, which constitutes a portion of the feedline of chamber 26 with drive air, wherein the feedline consists of volumes 122, 128, 132, 130 and 126 through which the drive air flows, as represented by flow arrows E2 in FIGS. 2, 3 and 6. Chamber 132 is intermediate between the inlet of the feedline, which consists of the mouth of duct 122, and the outlet of the line, which consists of the outlet of duct 136 into rotation chamber 26.

Elbows 128 and 130 allow the drive air flow E2 to be diverted along directions radial to axis X16, hence to axis X2 in the mounted configuration of sprayer 2, with respect to ducts 122 and 126. This way, the drive air may flow through a peripheral area 168 of the 16 that is radially further from axis X16 than ducts 120 and 122.

Radially inner surface 322 of ring 32 is provided with ribs 36 that create many baffles inside chamber 132, thereby increasing the contact area between the air flowing between elbows 128 and 130 inside chamber 132 and ring 32. Thus, ribs 36 are configured for enhancing heat exchange between drive air flowing through chamber 132 and ring 32.

We denote by L32 the axial length of ring 32; i.e. the length of the ring measured parallel to axis X16.

Further, we denote by L162 the axial length, as measured parallel to axis X162, of portion 162B of tubular portion 162 and denote by L164 the axial length, as measured parallel to axis X164, of base 164.

In the example, length L32 is equal to the sum of lengths L162 and L164. In practice, the ratio L32/(L162+L164) is chosen to be greater than 0.8, preferentially greater than 0.95. In other words, ring 32 surrounds the widest part of body 16 over most of the length thereof, as measured parallel to the axis of rotation.

In an embodiment, the ratio L32/(L162+L164) may be strictly greater than 1.

Figure 7:
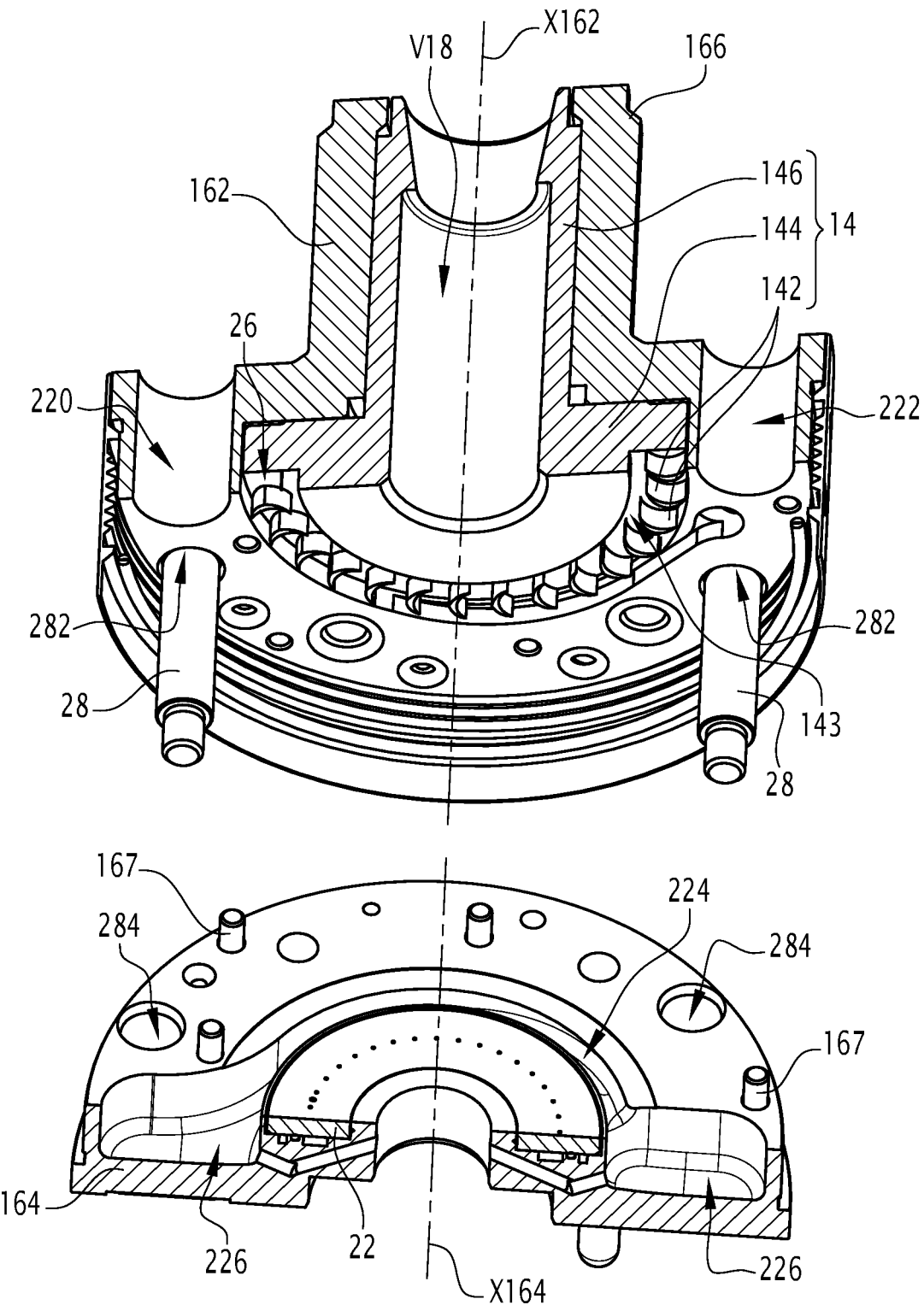

In the widest part of body 16 and as shown in FIG. 7, a spiral groove 224, comparable to grooves 124 and 126, is provided. Exhaust air is formed by drive air, after the air has been used to set rotor 14 in motion about axis X2, by applying a force orthoradial to axis X2 on blades 142. Spiral groove 224 opens into the two cavities 226 linked to two ducts 220 and 222 which form air exhaust ducts to the outside of body 16. The exhaust air flow is represented by arrows E3 in FIG. 4. Volumes 220-226 form together an exhaust air manifold for turbine 12.

Figure 4:
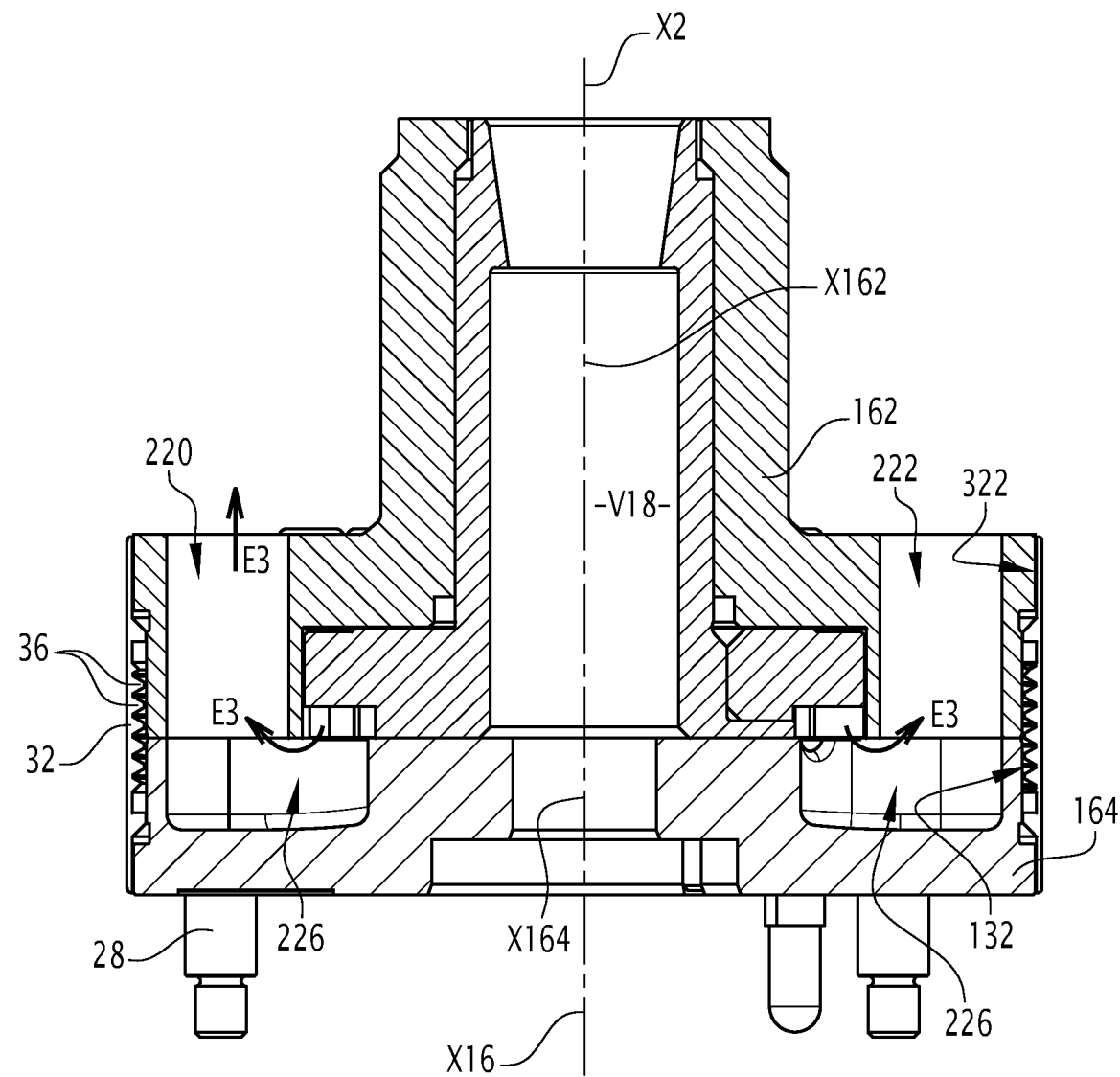
Figure 5:
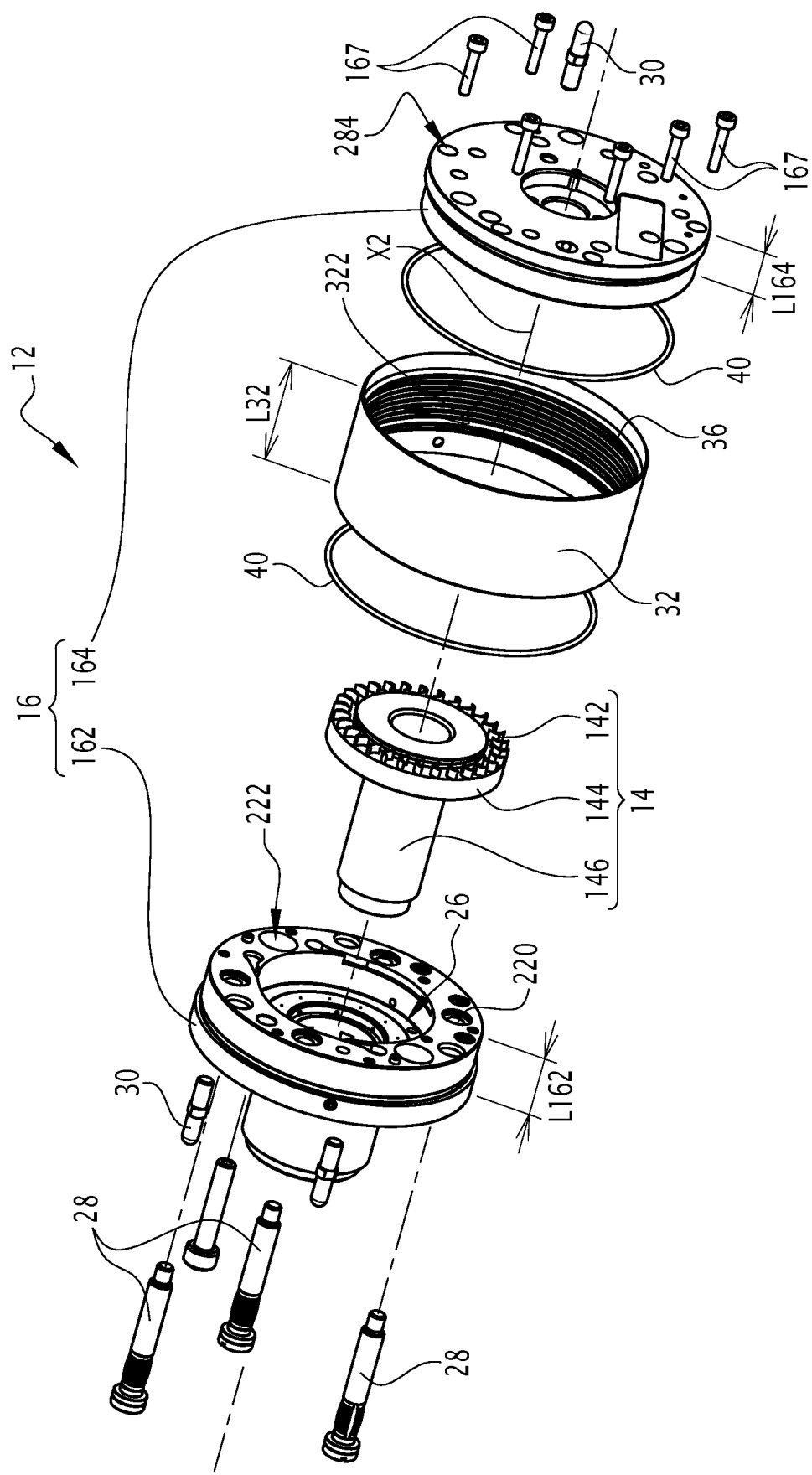

FIG. 4 shows that ring 32 "hides" exhaust manifold 220-226 in a direction radial to axis X2 from outside of body 16, in particular from cover 90 which surrounds body 2A and turbine 12.

Through annular chamber 132 formed between body 16 and ring 32, radially to axis X16, thus to axis X2 in the mounted configuration of sprayer 2, drive air for rotor 14 flows in the vicinity of the outermost surface of body 16 before being expanded; i.e., while it is at a relatively high temperature, on the order of 20 to 25° C. in a car paint shop where the temperature is regulated.

In this way, ring 32 may be maintained at or close to the temperature of the drive air before expansion. By "close" is meant that a difference between the temperature of ring 32 and the temperature of the drive air before expansion is less than 5° C.

The constituent material of ring 32 is advantageously chosen so as to facilitate heat exchange with air flowing through chamber 132.

Thus, ring 32 may be made of metal, e.g., steel or aluminum.

As length L32 is substantially equal to the sum of lengths L162 and L164 and as, under steady state conditions, ring 32 is at a homogeneous temperature, contact thereof with air flowing through chamber 132 prevents same from having water condensation over the entire length L162+L164 of the portion of body 16 consisting of portions 162B and 164, which is the portion of body 16 having the largest dimensions transversely to axis X2 and to axis X16.

At chamber 132, ring 32 is not in contact with portions 162B and 164. Ribs 36, in particular, extend away from surfaces S162 and S164 in a direction radial to axis X116. In other words, a gap J36, radial to axis X16 and having non-zero thickness, is present between each rib and surface S162 or S164 that faces the rib. In this way, drive air flows in a direction parallel to axis X16 in chamber 132, between the openings of elbows 128 and 130.

Ring 32 is provided with two stubs 38 arranged on both sides of ribs 36, each of which has a frustoconical surface 382, arranged opposite ribs 36. Frustoconical surfaces 382 converge toward each other as they approach axis X16. Each frustoconical surface 382 is angled at approximately 45° with respect to axis X16 and abuts against a seal 40, which in the unstressed configuration is an O-ring and is compressed in a receiving volume 42 with triangular cross-section. A first volume 42 is formed between a first stub 38 and portion 162B of body 16, while a second volume 42 is formed between the second stub 38 and base 164.

Stubs 38 are not in contact with either of surfaces S162 and S164, due to the presence of a radial clearance between the stubs and the surfaces. Thus, ring 32 is not in direct contact with body 16.

Given the respective orientations of frustoconical surfaces 382 of the two stubs 38, compression of the O-rings 40 has an effect of applying on ring 32 a wedging force which immobilizes ring 32 onto body 16. In addition, compression of the O-rings 40 has the effect of fluidically isolating chamber 132 from the exterior of body 16 and preventing transmission of cold between body 16 and ring 32, by conduction.

Since sprayer 2 is an electrostatic sprayer, same includes subassembly 56 brought to high voltage when sprayer 2 is operating, and which surrounds the front portion of turbine 12. Subassembly 56 is one of the components of sprayer 2 and defines channels 58 for flow of a shaping air forming a cloud of coating product droplets leaving the bowl edge, wherein subassembly 56 is sometimes referred to as a "shaping skirt".

In the case of an externally charged sprayer, the high voltage portions of sprayer 2 include electrodes which are not shown.

In an embodiment, sprayer 2 may not be electrostatic. In this case, same has no high voltage parts and no electrodes.

Since ring 32 is metallic in the example, same should not be at a floating electrical potential, especially because of the high voltage applied to subassembly 56, which is on the order of −60 to −100 kV.

A device 60 for maintaining ring 32 at the electrical potential of body 16 consists of a helical spring made of electrically conducting material, in particular metal, arranged in a blind hole 64 of body 16 and which pushes a ball 66, in a radial and centrifugal direction with respect to axis X16, into abutment against internal peripheral surface 322 of ring 32. Thus, even though not in contact with body 16 at ribs 36 and stubs 38, ring 32 is maintained at the electrical potential of body 16 by device 60.

According to the present invention, chamber 132, which constitutes a portion of the feedline supplying driving air to rotation chamber 26, allows air flowing through same to maintain ring 32 at a relatively high temperature, equal or close to that of the driving air at the inlet of body 16. In this way, the outer peripheral surface of body 16 in the widest portion thereof, which is formed by outer peripheral surface 324 of ring 32, is not likely to be at a temperature which could cause water condensation even if the exhaust air discharge circuit which includes portions 220-229 is also formed in the portion of body 16. Temperature control of peripheral surface 324 of ring 32, and hence of the peripheral surface of body 16, occurs without overconsumption of air since air flowing through intermediate chamber 132 is part of the air rotating rotor 14 of turbine 12.

Thus, cover 90 of sprayer 2 is not in danger of experiencing a drop in the temperature thereof in the vicinity of the widest part of body 16, to the extent that condensation droplets would form on the outer surface thereof, even if air in the coating booth wherein sprayer 2 is arranged has a high relative humidity, e.g., more than 55%. Surface temperature of sprayer 2, at the level of cover 90, is thus controlled by limiting a lowering of temperature of cover 90 that could result from flow of exhaust air.

Risks of damaging the applied coating product layer are thus minimized by the invention.

According to one aspect of the invention shown only in FIG. 3, a temperature sensor 35 is integrated into base 164 and enables detection of temperature of air flowing through intermediate chamber 132, and thus temperature of ring 32 to be estimated.

In an embodiment, sensor 35 is installed so as to directly detect temperature of ring 32 or temperature of cover 90.

The invention allows implementation of a method for monitoring surface temperature of sprayer 2, at the level of cover 90. This method includes feeding rotation chamber 26 with driving air, during which a flow of driving air, represented by arrows E2, is diverted to area 168 of body 16, more particularly to intermediate chamber 132, to control the temperature of area 168. This limits lowering of temperature of area 168 and cover 90, and prevents water from condensing in the vicinity of area 168, in particular on cover 90.

Advantageously, the output signal from sensor 35 is supplied to an unrepresented control unit of sprayer 2, which is configured to adjust operating parameters of sprayer 2. For example, a computer in the control unit may be programmed to decrease the rotational speed of rotor 14 if the temperature detected by sensor 35 approaches the dew point temperature to within 2° C. In addition, this unit may be configured to send an alert message to a main control unit of temperature or humidity of the air present in a booth wherein sprayer 2 is disposed, based on the temperature detected by the sensor 35. For example, if the temperature detected by sensor 35 approaches the dew point temperature to within 2° C., the main control unit may increase the set temperature of the ambient air or decrease its relative humidity.

Parts 20, 22 and 56 are part of body 2A of sprayer 2.

According to an embodiment of the invention, not shown, ribs 36 are replaced by a thread provided on inner peripheral surface 322 of ring 32.

According to another embodiment of the invention, not shown, air circulation occurs within a line internal to ring 32, for example a helical line. This is particularly applicable with a ring 32 manufactured by 3D printing.

According to another embodiment, inner peripheral surface 322 of ring 32 is smooth; i.e., without a pattern in relief.

According to another embodiment of the invention, ring 32 is made of a material other than metal, in particular of a plastic, composite or ceramic material.

According to another embodiment of the invention, only a part of the driving air flow flowing through duct 122 is directed to chamber 132. For this purpose, a direct communication, of reduced diameter, is formed between elbow 128 and groove 126, by means of a line 140 which is shown with centerlines in FIG. 3 only.

According to another embodiment of the invention, not shown, chamber 132 is supplied with drive air from the two ducts 120 and 122 and the two grooves 124 and 126 are fed from chamber 132.

According to another embodiment of the invention, not shown, spring 62 rests directly on ring 32, without interposition of ball 66.

According to another embodiment of the invention, not shown, elbows 128 and 130 are not arranged in the same radial plane with respect to axis X16, but are angularly offset about axis X16.

In another embodiment, peripheral zone 168 is defined as a zone of body 16 whose diameter is greater than 75%, preferentially 90%, of diameters D162B and D164.

According to another embodiment of the invention, not shown, chamber 132 is defined, radially to axis X2, between body 12 and cover 90. In this case, cover 90 constitutes a ring, in the sense of ring 32 of the embodiment shown in the figures, without having to add an additional part compared to known sprayers.

According to an embodiment of the invention, not shown, the component fed by the line that includes intermediate chamber 132 is not turbine 12, but subassembly 56 that defines channels 58. In this case, air flowing through intermediate chamber 132 is the skirt air, which is intended to pass through channels 58 and is used to shape the cloud of coating product droplets leaving the edge of bowl 10 when sprayer 2 is operating. In this case, too, air flowing through the intermediate chamber does not need to be supplied to the sprayer in addition to air used to provide normal sprayer operation. This embodiment may be used independently or in addition to the one shown in the figures.

According to yet another embodiment of the invention, not shown, the component supplied by the line that includes intermediate chamber 132 is not turbine 12, but a microphone used to measure rotational speed of rotor 14. In this case, air flowing through the intermediate chamber is feed air to one or a plurality of cavities, not shown and rigidly connected to rotor 14. The microphone is installed downstream of the cavities for detecting the frequency of noise induced by air flow in the cavities and transmitting a corresponding signal to a computing unit which determines speed of rotation of rotor 14 on the basis of the frequency. Again, this means that air flowing through the intermediate chamber does not need to be supplied to the sprayer in addition to air used for normal sprayer operation. This embodiment may also be implemented independently of or in addition to that shown in the figures.

The invention may be implemented for coating motor vehicle bodies, vehicle components, household appliance casings and more generally for any application of a rotary sprayer for a coating product.

The embodiments of the embodiment versions contemplated above may be combined to generate new embodiments of the invention.

The invention claimed is:

1. A rotary sprayer for a coating product, comprising:
   a spray bowl rotating about an axis of rotation; and
   an air turbine for rotating said spray bowl about the axis of rotation, comprising:
   a rotor; and
   a body forming a support for said rotor, and defining at least one feedline feeding air to a rotation chamber where rotor blades are arranged, wherein the at least one feedline comprises an intermediate chamber which is defined, radially to the rotation axis, between the body and a ring mounted around this body, and wherein the ring is provided, on the inner radial surface thereof, with at least one pattern in relief configured to enhance heat exchange between air circulating inside the intermediate chamber, and the ring.

2. The sprayer according to claim 1, wherein the at least one feedline comprises:
   at least one branch which extends parallel to the axis of rotation; and
   an elbow that connects the at least one branch with the intermediate chamber, radially to the axis of rotation.

3. The sprayer according to claim 1, wherein the at least one feedline comprises:
   a spiral portion perpendicular to the axis of rotation, which opens into the rotation chamber; and
   an elbow that connects the intermediate chamber with the spiral portion.

4. The sprayer according to claim 1, wherein said body comprises:
   a tubular part, which defines a housing for receiving said rotor; and
   a base, which closes off the housing opposite said bowl, and wherein the ring is mounted both around the tubular part and the base.

5. The sprayer according to claim 1, wherein the at least one pattern in relief comprises ribs or a thread.

6. The sprayer according to claim 1, wherein the ring is comprised of metal.

7. The sprayer according to claim 1, further comprising a sub-assembly for balancing electrical potential between the ring and said body.

8. The sprayer according to claim 7, wherein said sub-assembly comprises an elastically deformable electrically conducting member, which rests, directly or via an attached electrically conducting element, against the ring and against said body.

9. The sprayer according to claim 1, wherein the ring is immobilized around said body by wedging.

10. The sprayer according to claim 9, wherein at least one seal is placed in-between said body and the ring, and contributes to wedging of the ring around said body.

11. The sprayer according to claim 10, wherein two seals are placed in-between said body and the ring, and contribute to wedging of the ring around said body.

12. The sprayer according to claim 1, wherein the intermediate chamber is formed around a portion of said body wherein a manifold of exhaust gases from the turbine is formed.

13. The sprayer according to claim 1, equipped with a temperature sensor for determining temperature of air in the intermediate chamber, temperature of the ring, or temperature of a cover of the sprayer.

14. A method for controlling a surface temperature of a rotary sprayer for a coating product according to claim 1 comprising a spray bowl rotating about an axis of rotation and an air turbine for rotating the bowl about the axis of rotation, the turbine comprising a rotor and a body forming a support for the rotor, the method comprising feeding air to a rotation chamber where blades of the rotor are arranged, comprising diverting a flow of driving air for the rotor to a peripheral zone of the body and to the intermediate chamber of the rotary sprayer in order to limit lowering of temperature of a covering element of the sprayer.

15. The method according to claim 14, wherein the sprayer is equipped with a temperature sensor for determining temperature of air in the intermediate chamber, temperature of the ring, or temperature of a cover of the sprayer, the method further comprising adjusting, by a control unit of the sprayer, operating parameters of the sprayer, or of a booth wherein the sprayer is installed, depending on the output signal of the sensor.

* * * * *